UNITED STATES PATENT OFFICE.

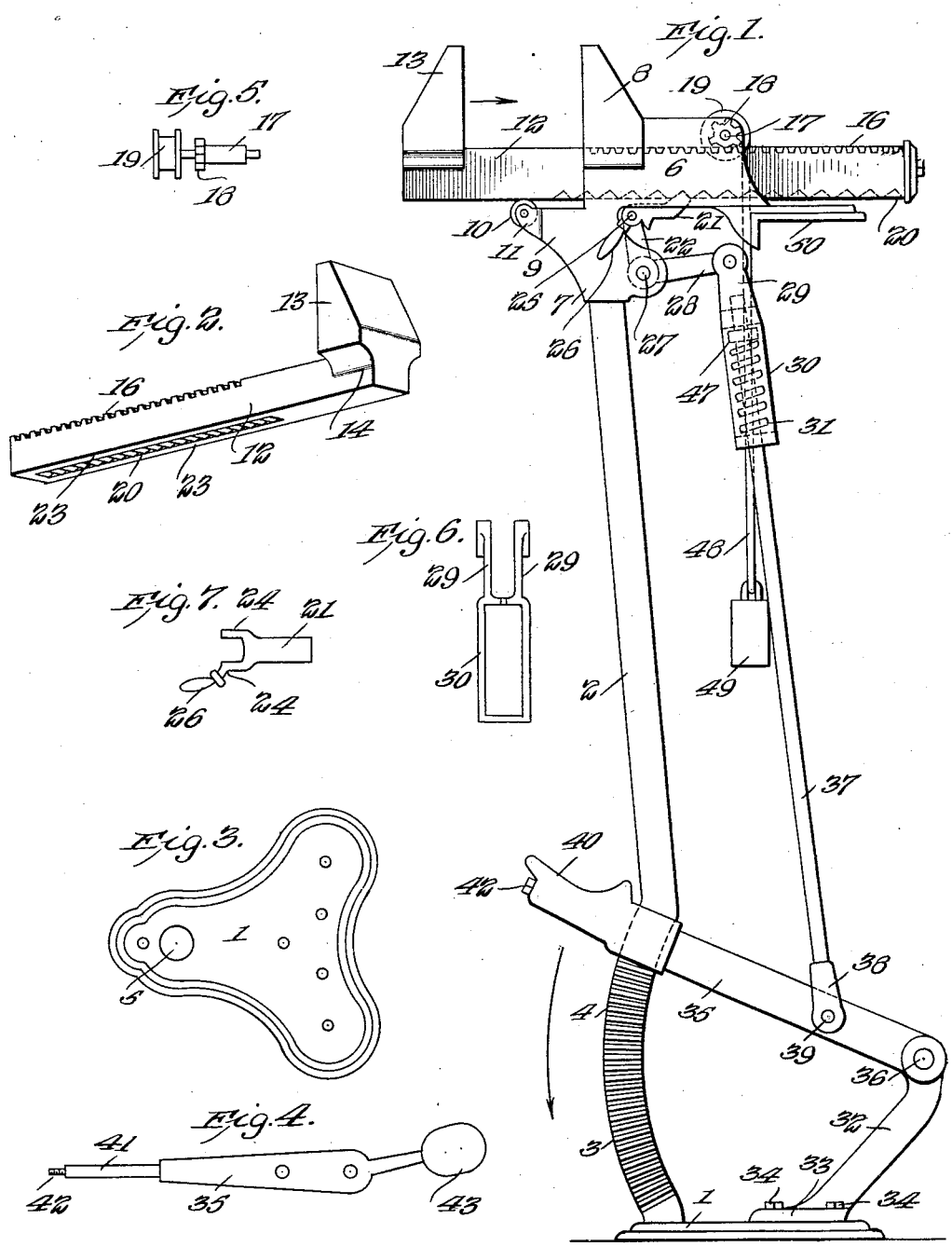
G. E. CALLAWAY.
FOOT POWER VISE.
APPLICATION FILED OCT. 26, 1911.
1,039,646.
Patented Sept. 24, 1912.
2 SHEETS—SHEET 1.
INVENTOR
GEORGE E. CALLAWAY
BY
ATTORNEYS G. E. CALLAWAY.
FOOT POWER VISE.
APPLICATION FILED OCT. 26, 1911.
1,039,646.
Patented Sept. 24, 1912.
2 SHEETS—SHEET 2.
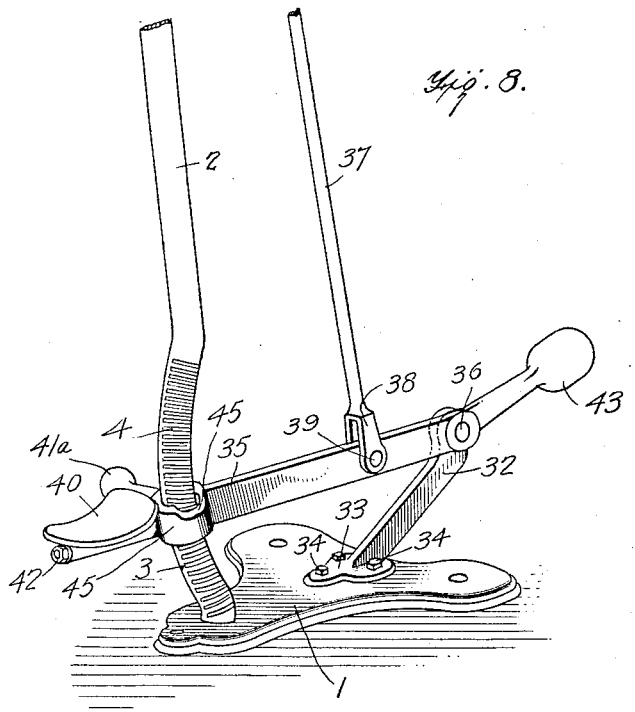
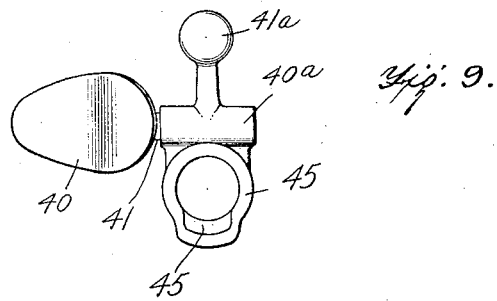
WITNESSES
INVENTOR
GEORGE E. CALLAWAY
BY
ATTORNEYS

GEORGE E. CALLAWAY, OF JONESBORO, LOUISIANA.

FOOT-POWER VISE.

1,039,646.  Specification of Letters Patent.  Patented Sept. 24, 1912.

Application filed October 26, 1911. Serial No. 656,848.

*To all whom it may concern:*

Be it known that I, GEORGE E. CALLAWAY, a citizen of the United States, and a resident of Jonesboro, in the parish of Jackson, State of Louisiana, have invented a new and useful Improvement in Foot-Power Vises, of which the following is a specification.

My invention is an improvement in vises, and has for its object the provision of a simple, inexpensive, automatically operating device of the character specified, wherein the jaws are counterbalanced to open of themselves, and the operating mechanism is counterbalanced to return to original position when released.

In the drawings: Figure 1 is a side view of the improvement; Fig. 2 is a perspective view of the sliding bar from below; Fig. 3 is a plan view of the base; Fig. 4 is a similar view of the operating lever; Fig. 5 is a plan view of the shaft and pinion; Fig. 6 is a front view of the frame; Fig. 7 is a plan view of the pawl; Fig. 8 is a perspective view of the lower portion of the improvement, and Fig. 9 is a plan view of the foot plate and connected parts.

The present embodiment of the invention comprises a base plate 1, to one end of which is connected a vertical post 2 provided at its lower end with an arched portion 3 having teeth 4 on one face. The bar 2 is received in an opening 5 in the base 1, the said base being of substantially triangular form. A sleeve 6 is provided with a depending socket 7 for receiving the upper end of the post, and the fixed jaw 8 of the vise is connected to the outer end of the sleeve. The sleeve is provided with an extension 9 at the lower part of its outer end, and a roller 10 is journaled between spaced ears 11 on the said extension.

The post 2 may be tubular in form, as, for instance, a section of pipe, and a bar 12 is slidable in the sleeve 6 supported by the post 2. The outer end of bar 12 carries the movable jaw 13 of the vise which is held to the bar in any suitable manner.

As shown in Fig. 2, the bar 12 is provided with teeth 16 on its upper face at the opposite end from the jaw, the said teeth extending partly across the bar. A shaft 17 is journaled transversely of the sleeve 6 above the bar and at the opposite end from jaw 8, and a pinion 18 is secured to the shaft and meshes with the teeth 16. A pulley or grooved wheel 19 is also secured to one end of the shaft, the said end being extended beyond the sleeve. The roller 10 engages the under face of the bar, reducing friction, and providing thus for an easy movement of the bar. The under face of the bar is provided with a series of teeth 20 which are engaged by a pawl 21 pivoted to one arm 22 of an elbow lever to be described.

The teeth 20 do not extend the full width of the bar (Fig. 2) and a rib 23 is thus provided at each side of the teeth, the face of the rib being flush with the points of the teeth. The pawl 21 is provided with spaced lugs 24, between which is received the arm 22 of the elbow lever, and a pivot pin 25 is passed through lugs and pawl. One of the lugs is extended to form a handle 26.

The elbow lever is pivoted at 27 to the socket 7, and the other arm 28 of the elbow lever is pivoted between a pair of ears 29 on an open frame 30. The frame is substantially rectangular and the ears 29 extend from one end, and a spring 31 is held in the frame. A bracket 32 is provided with a foot 33 which is secured by bolts 34 to the base 1, and a lever 35 has one end pivoted at 36 to the bracket. A link 37 is provided with a fork 38, whose arms engage the lever and are pivoted thereto by a bolt 39. The lever is provided at its free end with a foot plate 40 which is provided with a longitudinal opening for receiving a reduced portion 41 of the lever and is held in place by a nut 42 threaded onto the said portion.

The lever 35 is provided with a counterweight 43, on the opposite side of the bracket from the foot plate, and with a ring 45 sliding on the post 2. The ring is provided with an inwardly extending catch 45$^a$ for engaging the teeth 4 of the post 2 to lock the lever 35 in adjusted position. The ring 45 is provided with a sleeve or bearing 40$^a$, which is journaled on the reduced portion 41 of the lever 35, adjacent to the foot plate 40. The sleeve 40$^a$ is provided with a laterally extending weight 41$^a$ on the opposite side from the ring, for counter-balancing the said ring. The ring acts as a pawl for holding the lever in adjusted position, and it will be evident that when the lever is moved downwardly, the catch 45$^a$ of the ring will slide over the teeth. The weight 41$^a$ normally holds the catch in engagement with the teeth, so that in whatever position the lever is moved, the ring immediately engages the teeth to hold the lever in adjusted position. The upper end of link 37 is provided with a fixed collar or annular stop rib 47 spaced below the said upper end, and the link fits within the frame 30.

The ends of the frame are perforated to receive the link, and the stop 47 is below the upper end of the frame. The spring 31 encircles the link between the stop 30 and the lower end of the frame and acts to normally hold the parts in the position of Fig. 1. A strap 48 winds on pulley 19, and a weight 49 is connected to the lower end of the strap. The strap winds upon the pulley in a direction such that the weight tends to turn the pinion 17 in a direction to move the jaw 13 away from jaw 8.

The teeth 20 of the bar 12 are so cut that both faces are equally inclined, each face standing at an angle of 45°, and the end of pawl 21 is shaped to fit the space between two teeth. The pawl may be operated by the handle 26, and the said handle is a weight to hold the pawl in engagement with the teeth.

In use the vise may, if desired, be bolted to a bench, and a plate 50 is solid with the sleeve 6 for permitting this to be done. The weight 49 is of sufficient size to rotate the shaft 17 and move the jaw 13 away from jaw 8.

In operation, the jaws are approached by depressing lever 35 with the foot, thus leaving the hands of the operator free. When the lever is depressed the elbow lever 22—28 is rocked in a manner to cause the pawl 21 to move the slide bar 12 to the right of Fig. 1, to cause the jaws to grasp the article, and when the jaws are in adjusted position the lever is held by pawl 44 and teeth 4.

To release the article it is only necessary to release pawl 44, when the weight 49 will return the jaw 13 to the position of Fig. 1. The lever 35 is easy to operate, since the counter-balance lifts the lever. The connection between pawl 21 and its operating means is yielding, the spring 31 cushioning the parts from jar.

I claim:

1. A vise comprising a base, a post on the base provided with a series of teeth at its lower end, a sleeve having a depending socket for engaging the top of the post, a jaw on the sleeve, a slide bar provided with a jaw movable in the sleeve, said bar having a series of gear teeth on its upper face and a series of teeth on its lower face, a shaft journaled in the sleeve above the bar, a pinion on the shaft engaging the teeth on the upper face of the bar, a pulley on the shaft, a strap winding on the pulley, a counterweight for the slide bar connected to the strap and arranged to rotate the shaft to move the slide bar jaw away from the other jaw, an elbow lever pivoted on the sleeve, a pawl pivoted to one arm of the lever and engaging the teeth on the lower face of the slide bar, a counterweight for holding the pawl in engagement with the teeth, a bracket on the base, a lever pivoted at one end to the bracket and provided with a counterbalance on the opposite side of the bracket, a foot plate on the free end of the lever, a pawl pivoted to the foot plate and engaging the teeth of the post, a link pivoted at one end to the lever, a frame pivoted to the other arm of the elbow lever, and a spring connecting the link to the frame.

2. A vise comprising a base, a post on the base provided with a series of teeth at its lower end, a sleeve having a depending socket for engaging the top of the post, a jaw on the sleeve, a slide bar provided with a jaw movable in the sleeve, said bar having a series of gear teeth on its upper face and a series of teeth on its lower face, a shaft journaled in the sleeve above the bar, a pinion on the shaft engaging the teeth on the upper face of the bar, a pulley on the shaft, a strap winding on the pulley, a counterweight for the slide bar connected to the strap and arranged to rotate the shaft to move the slide bar jaw away from the other jaw, an elbow lever pivoted on the sleeve, a pawl pivoted to one arm of the lever and engaging the teeth on the lower face of the slide bar, a counterweight for holding the pawl in engagement with the teeth, a bracket on the base, a lever pivoted at one end to the bracket and provided with a counterbalance on the opposite side of the bracket, a foot plate on the free end of the lever, a pawl pivoted to the foot plate and engaging the teeth of the post, and a yielding connection between the lever and the other arm of the elbow lever.

3. A vise comprising a base, a post on the base provided with a series of teeth at its lower end, a sleeve having a depending socket for engaging the top of the post, a jaw on the sleeve, a slide bar provided with a jaw movable in the sleeve, said bar having a series of gear teeth on its upper face and a series of teeth on its lower face, a shaft journaled in the sleeve above the bar, a pinion on the shaft engaging the teeth on the upper face of the bar, a pulley on the shaft, a strap winding on the pulley, a counterweight for the slide bar connected to the strap and arranged to rotate the shaft to move the slide bar jaw away from the other jaw, an elbow lever pivoted on the sleeve, a pawl pivoted to one arm of the lever and engaging the teeth on the lower face of the slide bar, a counterweight for holding the pawl in engagement with the teeth, a lever pivoted to the base, a pawl on the lever for engaging the teeth of the post, and a yielding connection between the lever and the other arm of the elbow lever.

4. A vise comprising a base, a post on the base, a sleeve having a depending socket for engaging the top of the post, a jaw on the sleeve, a slide bar provided with a jaw movable in the sleeve, said bar having a series of gear teeth on its upper face and a series of teeth on its lower face, a shaft journaled in the sleeve above the bar, a pinion on the shaft engaging the teeth on the upper face of the bar, a pulley on the shaft, a strap winding on the pulley, a counterweight for the slide bar connected to the strap and arranged to rotate the shaft to move the slide bar jaw away from the other jaw, an elbow lever pivoted on the sleeve, a pawl on one arm of the lever engaging the teeth on the lower face of the slide bar, a lever on the base, means for holding the lever in adjusted position, and a yielding connection between said lever and the other arm of the elbow lever.

5. A vise comprising a base, a post on the base, a sleeve having a depending socket for engaging the top of the post, a jaw on the sleeve, a slide bar provided with a jaw movable in the sleeve, means normally acting to move the slide bar to separate the jaws, an elbow lever pivoted on the sleeve, a pawl on one arm of the lever, said bar having teeth for engagement by the pawl, and means engaging the other arm of the elbow lever to move the slide bar in the opposite direction, said means comprising a lever pivoted to the base and provided with a counterbalance, a yielding connection between the lever and the said other arm of the elbow lever, and means for holding the lever in adjusted position.

6. A vise comprising a base, a post on the base, a sleeve having a depending socket for engaging the top of the post, a jaw on the sleeve, a slide bar provided with a jaw movable in the sleeve, means normally acting to move the slide bar to separate the jaws, an elbow lever pivoted on the sleeve, a pawl on one arm of the lever, said bar having teeth for engagement by the pawl, and means engaging the other arm of the elbow lever to move the slide bar in the opposite direction, and a yielding connection between the said means and the said arm.

7. A vise comprising a post, a sleeve on the post provided with a jaw, a slide bar in the sleeve provided with another jaw coöperating with the first named jaw, means acting normally to move the slide bar to separate the jaws, and normally operative means for moving the slide bar in the opposite direction, said means comprising an elbow lever pivoted to the sleeve, a pawl on one of the arms of the elbow lever, said slide bar having teeth for engagement by the pawl, and means engaging the other arm of the elbow lever for swinging said lever, and a yielding connection between the arm and the operating means.

GEORGE E. CALLAWAY.

Witnesses:
J. M. BRADLEY,
R. C. CULPEPPER.

Copies of this patent may be obtained for five cents each, by addressing the "Commissioner of Patents. Washington, D. C."